United States Patent [19]

Havel

[11] Patent Number: 4,777,359

[45] Date of Patent: Oct. 11, 1988

[54] POSITION INDICATOR WITH LIGHT EMITTER AND TWO LIGHT SENSORS

[76] Inventor: Karel Havel, P.O. Box 66, Station M, Toronto, Ontario, Canada, M6S 4T2

[21] Appl. No.: 91,606

[22] Filed: Aug. 31, 1987

Related U.S. Application Data

[62] Division of Ser. No. 874,028, Jun. 13, 1986, Pat. No. 4,692,612.

[51] Int. Cl.[4] .............................................. G01D 5/34

[52] U.S. Cl. ..................................... 250/229; 250/239

[58] Field of Search ................ 250/221, 222.1, 223 R, 250/561, 227, 201 AF, 229, 239; 354/403

[56] References Cited

U.S. PATENT DOCUMENTS

| | | | |
|---|---|---|---|
| 4,306,147 | 12/1981 | Fukuyama et al. | 250/237 R |
| 4,323,786 | 4/1982 | Snow | 250/223 R |
| 4,659,922 | 4/1987 | Duncan | 250/222.1 |

*Primary Examiner*—David C. Nelms
*Assistant Examiner*—Stephone B. Allen

[57] ABSTRACT

A switching device includes a contact movable between two positions, to selectively open and close an electrical path, and a multicolor light emitting diode for indicating different positions of the contact by respectively different colors. The multicolor light emitting diode directs a light beam which is reflected from the contact in accordance with its position on one of two light sensors. The color of the light beam is controlled in accordance with the outputs of the light sensors.

1 Claim, 1 Drawing Sheet

POSITION INDICATOR WITH LIGHT EMITTER AND TWO LIGHT SENSORS

CROSS-REFERENCE TO RELATED APPLICATIONS

This is a division of my copending application Ser. No. 06/874,028 filed June 13, 1986 and entitled Switch Position Detector and Indicator with Multicolor Light Emitter (as amended), now U.S. Pat. No. 4,692,612 issued Sept. 8, 1987.

BACKGROUND OF THE INVENTION

1. Field of the Invention

This invention generally relates to electromagnetically actuated switches and more specifically to a method and apparatus for verifying correct positions of a contact in a switch.

2. Description of the Prior Art

Commerically well known reed relay usually includes two flat reed contacts enclosed in a sealed tube. The reed contacts are made from soft magnetic material and serve as a core for transferring magnetic flux. When a magnetic field is produced by energizing a winding that surround the tube, the reed contacts are mutually magnetically attracted into a contact engagement. To achieve consistent contact resistance, the reed contacts must be perfectly parallel and precisely positioned. Incorrect contact position, due to manufacturing imperfections or misuse, may adversely affect performance and life span of the relay. A certain degree of operational integrity of a relay may be verified by measuring resistance of its contacts when the relay is energized. However, such tests do not reveal slightly misaligned contacts, due not unveil marginal relays, and are not always practical to perform in complex devices that contain large numbers of relays.

A switching device in the form of a reed relay including a pair of magnetically soft reed contacts and control winding for effecting closure of the contacts is disclosed in U.S. Pat. No. 3,070,677 issued on Dec. 25, 1962 to Terrell N. Lowry.

A switching device capable of displaying different positions of its contact by respectively different colors is unknown.

A multicolor semiconductor lamp comprising a plurality of light emitting diodes for emitting light of respectively different colors is disclosed in U.S. Pat. No. 3,875,456 issued on Apr. 1, 1975 to Tsuyoshi Kano et al. The light emitting diodes are closely adjacent and covered by a layer of light scattering material to provide an appearance of a single light source.

SUMMARY OF THE INVENTION

The present invention endeavors to provide a method and apparatus for verifying the correct positions, in open and closed states, of a contact in a switching device.

It is the primary object of the invention to provide a switching device that includes a multicolor light emitting diode for indicating different positions of a movable contact by respectively different colors.

In summary, the invention resides in the addition, to a switching device, of a multicolor light source for directing a light beam on a movable contact. The light beam is reflected from the contact in accordance with its position on one of two light sensors. The output of the light sensor activated by the reflected light beam is used to control the color of the light beam to thereby indicate the position of the contact.

Further objects of the invention will become obvious from the accompanying drawings and their description.

BRIEF DESCRIPTION OF THE DRAWINGS

In the drawings in which are shown several possible embodiments of the invention.

Throughout the drawings, like characters indicate like parts.

DESCRIPTION OF THE PREFERRED EMBODIMENTS

Figure 1:
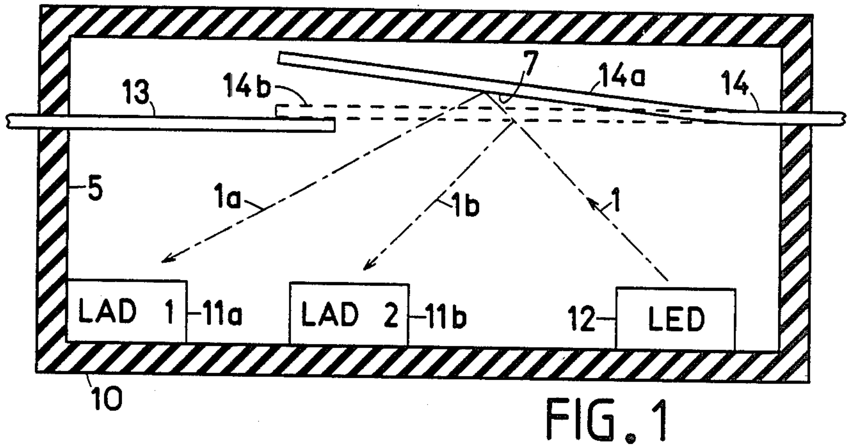
FIG. 1 is a cross-sectional view illustrating the inventive concepts of a switching device of the present invention.

Referring now, more particularly, to the drawings, in FIG. 1 is shown, in very general configuration, a switching device of the present invention in the form of a reed relay accommodated in a sealed opaque enclosure 10 having internal substantially non-reflecting surfaces 5. It would be obvious to those skilled in the art that the principles of the invention may be alternatively applied to other types of relays and switching devices, such are reciprocating, rotary, step-by-step, and armature types.

The switching device includes a pair of flat reed contacts 13 and 14 extending through the enclosure and having overlapping ends inside thereof adapted for contact engagement. The reed contacts may be provided with externally projecting terminals adapted for joining conductors thereto (not shown). Stationary reed contact 13 is secured in one wall of the enclosure, and a movable reed contact 14 having a flexible portion (not shown) and being capable of moving between its first angular position 14a and second angular position **14*b* is secured in the opposite wall. The switching device also includes a multicolor LED (Light Emitting Diode) 12 disposed within the enclosure and adapted for directing a light beam of a predetermined color on a reflecting surface 7 of the movable reed contact 14. Two LADs (Light Activated Devices) 11*a* and 11*b* are also disposed within the enclosure and oriented to respectively intercept reflected light beams 1*a* and 1*b*. When the movable contact is in its normally open position 14*a*, light beam 1 emitted by the LED 12 reflects from a reflecting surface 7, and reflected light beam 1*a* is directed on the active area of the LAD 11*a*. When the movable contact is in its closed position 14*b*, reflected light beam 1*b* is directed on the LAD 11*b***. The output of the LAD activated by the light beam is used to control the color of the light beam emitted by the LED, as will be more fully revealed subsequently, to thereby indicate the position of the movable contact.

The term 'light activated device' as used throughout the description of the invention is intended to be interpreted in a broad sense and may include phototransistors, photodiodes, photodarlingtons, phototriacs, photo sensitive silicon controlled rectifiers, photodetectors, photoresistors, photoconductive cells, and the like.

Figure 2:
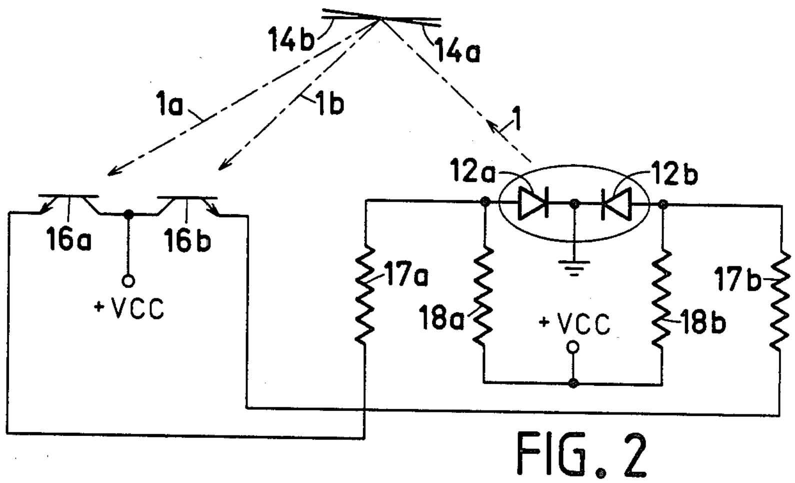
FIG. 2 is a schematic diagram of a circuit for verification of the contact position.

A device for verification of the contact position in the switching device of the present invention is illustrated in a schematic diagram form in FIG. 2. The device employs commercially well known phototransistors **16*a* and 16*b*, which exhibit very high resistance, typically hundreds of Megaohms, when maintained in dark and very low resistance, typically tens of Ohms, when illuminated, and a multicolor light source utilizing a red light emitting diode 12*a* and green light emitting diode 12*b*. When a positive voltage +VCC of a suitable value is applied to the circuit, current flows from +VCC, via resistor 18*a* and LED 12*a* to ground and, in parallel, via resistor 18*b* and LED 12*b* to ground. The resistors 18*a* and 18*b* are selected to have relatively large values. By way of an example, when voltage +VCC is +5 Volts and each resistor 18*a*, 18*b* is approximately 10 kOhms, the current in each LED branch is approximately 0.5 mA. As a consequence, both LEDs faintly illuminate, and relatively faint light beam 1 of substantially yellow color is produced by blending emissions of the red and green primary colors and is directed to the movable contact. When the contact is in its position 14*a*, reflected light beam 1*a* is directed on the phototransistor 16*a*, thereby causing it to exhibit decreased resistance. Additional current now flows from +VCC, via lower resistance of the phototransistor 16a, current limiting resistor 17*a* of relatively small value and red LED 12*a* to ground. By virtue of a positive optical feedback between the LED 12*a* and phototransistor 16*a*, whereby the increase in luminance of the LED causes the decrease in resistance of the phototransistor which in turn has an effect of further increase in the luminance and further decrease in the resistance, the current in the phototransistor branch, from +VCC, via phototransistor 16*a*, resistor 17*a*, and LED 12*a*, sharply rises to a value sufficient to maintain the LED brightly illuminated. If we consider an exemplary value of the resistor 17*a* to be approximately 1 kOhm, current in the phototransistor 16*a* branch reaches approximately 5 mA. Thus the combined current through the red LED 12*a* is approximately 5.5 mA, while current through the green LED 12*b* remains to be approximately 0.5 mA. The red LED is brightly illuminated, and the green LED is faintly illuminated. The color of composite light beam 1 is therefore predominantly red. It is readily apparent that this state exists as long as the contact is in its position 14*a***.

When the contact is in its other position **14*b*, reflected light beam 1*b* is directed on the phototransistor 16*b*, thereby causing it to exhibit decreased resistance. Additional current now flows from +VCC, via low resistance of the phototransistor 16*b*, resistor 17*b* and green LED 12*b* to ground. Considering again the resistor 17*b* to be approximately 1 kOhm, current in the branch of the phototransistor 16*b* reaches approximately 5 mA. Thus the combined current through the green LED 12*b* is approximately 5.5 mA, while current through the red LED 12*a* remains to be approximately 0.5 mA. The color of composite light beam 1 is therefore predominantly green. This state exists as long as the contact is in its position 14*b***.

When the contact is in an incorrect position different from the position **14*a* or 14*b*, e.g., because it is misaligned, bent, or broken, the reflected light beam falls either in an incorrect direction or there is no reflected light beam at all. There is no optical feedback, and both phototransistors 16*a* 16*b* exhibit very high resistances. Consequently, the light beam 1** remains to be faint and of substantially yellow color, thereby indicating that the contact is out of position.

Figure 3:
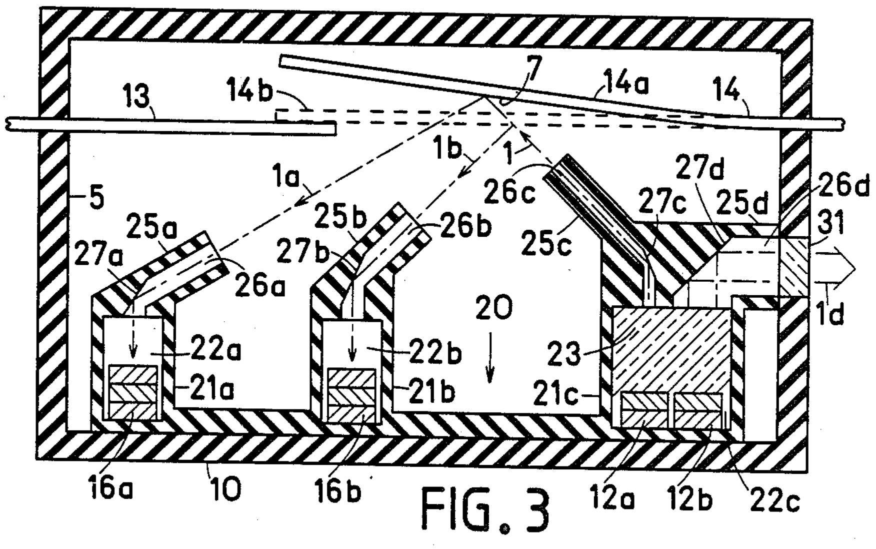
FIG. 3 is a cross-sectional view revealing internal structure of a switching device of the invention.

An important consideration has been given to physical arrangement of the light sources and sensors in the switching device of the invention, as illustrated in FIG. 3. The contact position sensing assembly is generally designated 20 and includes a chamber **21*c* having a cavity 22*c* formed therein for light emitting diodes 12*a* and 12*b*, chamber 21*a* having cavity 22*a* formed therein for phototransistor 16*a*, and chamber 21*b* having cavity 22*b* formed therein for phototransistor 16*b*. The dimensions of the chambers should be considered as merely illustrative and may be modified. The light signals emitted by light emitting diodes 12*a* and 12*b* are blended by passing through light scattering material 23 and emerge at its top surface as a composite light signal having color in accordance with the conditions of respective light emitting diodes. Larger portion of the composite light signal is reflected from an inclined reflecting surface 27*d* and directed by a director 25*d* through transparent member 31 out of the enclosure as a beam 1*d* to allow external visual observation of the contact position. Complete hermetic seal between the internal wall of the enclosure and the director 25*d*** may be achieved by disposing a sealant adhesive therein so as to secure the interior of the enclosure from the presence of ambient light.

The remaining portion of the composite light signal is directed via relatively narrow aperture **26*c* in the light director 25*c*, reflected by the inclined reflecting surface 27*c*, and emerges from the end of the director as relatively narrow light beam 1 at an angle about 45 degrees from the longitudinal axis of the enclosure 10. The light beam reflects from the reflecting portion 7 of the movable contact 14 in accordance with its angular position. The reflecting portion of the contact may have the form of highly polished metallic surface or, alternatively, a miniature mirror secured to the contact surface. When the contact is in its open position 14*a*, reflected light beam 1a is directed into aperture 26*a* in the light director 25*a*, reflected by the inclined reflecting surface 27*a* to an active surface of the phototransistor 16*a*. When the contact is in its closed position 14*b*, reflected light beam 1*b* is directed into aperture 26*b* in the light director 25*b*, reflected by the inclined reflecting surface 27*b* to an active surface of the phototransistor 16*b*. The apertures 26*a* and 26*b*** are slightly larger than the width of the expected light beam to allow for small deviations in the contact positions.

It would be obvious to those skilled in the art that, alternatively, light channeling devices such are mirrors, prismatic devices, lenses, optical fibers, filters, and the like, may be used.

The invention may be now briefly summarized. The method was disclosed of indicating position of a movable contact element in a switching device by directing a multicolor light beam on the reflecting surface of the contact element, obtaining therefrom a reflected light beam having a direction in accordance with the position of the contact element, and controlling the color of the multicolor light beam in accordance with the direction of the reflected light beam to thereby indicate the position of the contact.

A novel switching device capable of verifying correct positions of its contact was disclosed. The switching device is accommodated in a sealed opaque enclosure having internal substantially non-reflecting surfaces. A pair of contact elements extends through the enclosure and has contact ends inside of the enclosure adapted for engagement. At least one of the contact elements is movable between its first position, in which it closes an electrical path with the other contact element, and its second position, in which it opens the path. The movable contact element has a reflecting surface. A multicolor light source is disposed within the enclosure and adapted for directing a light beam on the reflecting surface of the movable contact element whereby a reflected light beam is obtained having a direction in accordance with the position of the movable contact element. Light sensors are provided for intercepting the reflected light beam to determine its direction. The color of the light beam is controlled in accordance with the direction of the reflected light beam to thereby indicate the position of the movable contact element. A portion of the light beam is directed out of the enclosure to provide an external visual indication of the contact position.

All matter herein described and illustrated in the accompanying drawings should be interpreted as illustrative and not in a limiting sense. It would be obvious that numerous modifications can be made in the construction of the preferred embodiments shown herein, without departing from the spirit of the invention as defined in the appended claims.

What I claim is:

1. A position sensing assembly comprising:

a substantially flat elongated support;

a first chamber secured to said support and having formed therein a cavity and a first light director for guiding a light beam to said cavity, said first light director defining a first angle with said support, a first light sensor being disposed in said cavity;

a second chamber secured to said support and having formed therein a cavity and a second light director for guiding a light beam to said cavity, said second light director defining a second angle with said support, said first angle and said second angle being different, a second light sensor being disposed in said cavity;

a third chamber secured to said support and having formed therein a cavity and a third light director for guiding a light beam from said cavity, said third light director defining a third angle with said support, a light source for emitting a light beam being disposed in said cavity;

whereby the light beam emitted by said light source in said third chamber via said third light director may be reflected by a reflecting surface on an object adjacent to said third light director and may be directed either to said first chamber via said first light director onto said first light sensor, to said second chamber via said second light director onto said second light sensor, or in a different direction, in accordance with the angular position of said object with respect to said third light director.

* * * * *